United States Patent [19]

Vasta

[11] Patent Number: 4,490,501

[45] Date of Patent: Dec. 25, 1984

[54] COATING COMPOSITION OF A FLUOROCARBON POLYMER AND A POLYAMINE CURING AGENT

[75] Inventor: Joseph A. Vasta, Wilmington, Del.

[73] Assignee: E. I. Du Pont de Nemours and Company, Wilmington, Del.

[21] Appl. No.: 583,976

[22] Filed: Feb. 27, 1984

Related U.S. Application Data

[63] Continuation-in-part of Ser. No. 509,703, Jun. 30, 1983.

[51] Int. Cl.$^3$ .................. C07C 102/06; C07C 103/10; C07C 103/87; C08K 3/10
[52] U.S. Cl. .................................... 524/413; 428/325; 428/363; 428/421; 428/422; 428/413; 524/433; 524/546; 525/326.2; 525/326.3; 525/368; 525/377; 525/381
[58] Field of Search ............... 428/325, 363, 413, 421, 428/422; 524/413, 433, 546; 525/326.2, 326.3, 368, 377, 381

[56] References Cited

U.S. PATENT DOCUMENTS

| | | | |
|---|---|---|---|
| 2,979,418 | 4/1961 | Dipner | 117/72 |
| 3,093,264 | 6/1963 | Harris | 220/63 |
| 3,343,841 | 9/1967 | Close | 427/386 |
| 3,366,612 | 1/1968 | Baldwin et al. | 260/85.3 |
| 3,470,014 | 9/1968 | Koblitz et al. | 117/72 |
| 3,526,532 | 9/1970 | Heiberger | 117/75 |
| 3,558,345 | 1/1971 | Baum et al. | 117/54 |
| 3,692,558 | 9/1972 | Werner | 117/72 |
| 3,824,115 | 7/1974 | Segawa et al. | 117/21 |
| 3,850,674 | 11/1974 | Clarke, Jr. et al. | 117/76 |
| 3,951,913 | 4/1976 | Kometani et al. | 525/326.3 |
| 3,955,036 | 5/1976 | Plueddemann | 428/429 |
| 3,988,502 | 10/1976 | Patel et al. | 526/18 |
| 4,035,565 | 7/1977 | Apotheker et al. | 526/249 |
| 4,098,756 | 7/1978 | Miller et al. | 523/458 |
| 4,146,532 | 3/1979 | Kometani et al. | 526/247 |
| 4,146,874 | 2/1979 | Oka et al. | 524/458 |
| 4,170,686 | 10/1979 | Miller et al. | 428/416 |
| 4,179,542 | 12/1979 | Christofas et al. | 428/324 |
| 4,237,177 | 12/1980 | Slama et al. | 428/215 |
| 4,243,767 | 1/1981 | Kaufman et al. | 525/342 |
| 4,243,770 | 1/1981 | Tatemoto et al. | 525/368 |
| 4,250,278 | 2/1981 | Suzuki et al. | 525/341 |
| 4,284,548 | 8/1981 | Kaufmann et al. | 525/102 |
| 4,298,416 | 11/1981 | Casson et al. | 156/87 |
| 4,299,869 | 11/1981 | Casson et al. | 428/35 |
| 4,307,142 | 12/1981 | Blitstein et al. | 428/143 |
| 4,323,603 | 4/1982 | Close | 524/545 |
| 4,339,553 | 7/1982 | Yoshimura et al. | 524/546 |
| 4,339,565 | 7/1982 | Tomeda | 528/27 |
| 4,347,277 | 8/1982 | Slama et al. | 428/215 |
| 4,370,436 | 1/1983 | Nakamura | 524/546 |
| 4,400,482 | 8/1983 | Close | 524/114 |

FOREIGN PATENT DOCUMENTS 53002 6/1982 European Pat. Off. .
58393 8/1982 European Pat. Off. .

OTHER PUBLICATIONS

Derwent Abst. 52946 w/32, (12-1974).
Bulletin No. 78C-15 by Abbott Laboratories, Industrial Amines, pp. 1-3.
Du Pont Sales brochure-Viton ® Fluoroelastomers.
Abstract from Official Gazette, Aug. 23, 1983, p. 1602-U.S. 4,400,482.

Primary Examiner—Herbert J. Lilling
Attorney, Agent, or Firm—Hilmar L. Fricke

[57] ABSTRACT

A coating composition of a fluorocarbon polymer which cures at ambient temperatures in which the fluorocarbon polymer is of vinylidene fluoride and hexafluoropropylene and has a weight average molecular weight of about 50,000-600,000; the composition contains a metallic oxide such as magnesium oxide which is an acid acceptor, and
an aliphatic or cycloaliphatic polyamine curing agent;

preferably, the composition contains a reinforcing pigment such as titanium dioxide.

The coating composition is used to provide corrosion and abrasion resistant coatings for large structures such as chemical plants, oil refineries, oil drilling platforms, and as a coating for the interior of smoke stacks of large utility companies.

24 Claims, No Drawings

COATING COMPOSITION OF A FLUOROCARBON POLYMER AND A POLYAMINE CURING AGENT

CROSS REFERENCE TO RELATED APPLICATIONS

This application is a continuation-in-part of application Ser. No. 509,703 filed June 30, 1983.

BACKGROUND OF THE INVENTION

This invention is related to a coating composition and in particular to a fluorocarbon polymer coating composition.

Fluorocarbon polymers are inert to strong acids such as sulfuric acid, nitric acid, hydrochloric acid and strong bases such as sodium hydroxide and are resistant weathering and salt water corrosion and are tough and abrasion resistant. Coatings of these polymers would be extremely useful for chemical plants and oil refineries to coat pipes, vessels and other equipment, for off shore oil well platforms and ships, and for protective coatings for the interior of smoke stacks of utility companies. Fluorocarbon polymer coatings also would be useful for coating metal smoke stack interiors that are subjected to abrasion from fly ash and corrosion by acids resulting from combustion products such as $SO_x$ and $NO_x$ and halogen ions. Conventional fluorocarbon polymer coatings require curing at elevated temperatures which is not possible with the aforementioned large structures. A fluorocarbon polymer coating composition is needed that will completely cure at ambient temperatures.

The composition of this invention is directed to a coating that cures at ambient temperatures, has excellent adhesion to a variety of substrates and is corrosion and abrasion resistant.

SUMMARY OF THE INVENTION

A coating composition containing about 10-70% by weight binder and 30-90% by weight of an organic solvent, wherein the binder is
 a fluorocarbon polymer of vinylidene fluoride and hexafluoropropylene and has a weight average molecular weight of about 50,000-600,000;
 a metallic oxide such as magnesium oxide which is an acid acceptor and
 a curing agent of the formula

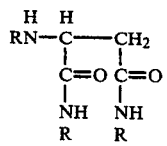

where R is $R^1NH_2$ and $R^1$ is an aliphatic or cycloaliphatic hydrocarbon radical; preferably, the composition contains a reinforcing pigment such as titanium dioxide.

DETAILED DESCRIPTION OF THE INVENTION

The coating composition contains about 10-70% by weight binder and about 30-90% by weight organic solvent. The binder is a blend of a fluorocarbon polymer, a metallic oxide which is an acid acceptor and a curing agent. One of the advantages of the composition is that it cures at ambient temperatures and baking is not required. Therefore, the composition can be used on large structures such as chemical storage tanks, chemical reactors the interior of smoke stacks and the like. These structures could not be subjected to baking temperatures using conventional techniques.

The fluorocarbon polymer is of polymerized monomers of vinylidene fluoride and hexafluoropropylene. Preferably, the polymer contains about 50-70% by weight of vinylidene fluoride and 30-50% by weight of hexafluoropropylene. The polymer can contain up to 40% by weight of other monomers such as tetrafluoroethylene. One useful polymer contains about 20-30% by weight of tetrafluoroethylene.

The fluorocarbon polymer has a weight average molecular weight of about 50,000-600,000. Preferably, fluorocarbon polymers are used that have a weight average molecular weight of about 75,000-450,000. Fluorocarbon polymers having a weight average molecular weight of 50,000-300,000 are useful. Two particularly useful fluorocarbon polymers have weight average molecular weight of about 75,000-125,000 and 150,000-250,000. Polymers in the lower end of the molecular weight range are preferred for forming a composition with higher binder content. Fluorocarbon polymers in the higher molecular weight range of 300,000-450,000 are also very useful for forming coating compositions.

Molecular weight, as used herein, is determined by gel permeation chromatography using polymethyl methacrylate as a standard.

A metallic oxide which is an acid acceptor is used in the composition to react with the hydrofluoric acid which is generated during the curing or crosslinking reaction. Typical metallic oxides are magnesium oxide, lead oxide, calcium oxide, lead hydrogen phosphite and a mixture of calcium oxide and magnesium oxide. Magnesium oxide is preferred. Highly purified magnesium oxide is particularly preferred for high quality finishes.

The coating composition contains an amine curing agent of the formula

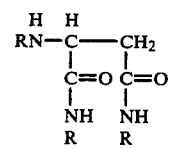

where R is $R^1NH_2$ and $R^1$ is an aliphatic or cycloaliphatic hydrocarbon radical.

The curing agent is prepared by reacting 3 moles of an aliphatic or cycloaliphatic polyamine with 1 mole of a dialkyl maleate. Reaction temperatures of about 100°-150° C. are used for about 1-6 hours to form the curing agent while an alkanol resulting from the reaction is removed.

Typical polyamines used to form the curing agent are isophorone diamine which is 3-aminomethyl-3,5,5-trimethylcyclohexylamine, hexamethylene diamine, ethylene diamine, 1,4-cyclohexane bis(methylamine), 1,2 diaminopropane, propylene diamine, diethyl ether diamine, trimethyl hexamethyl methylene diamine. Typical dialkyl maleates are dimethyl maleate, diethyl maleate, ethyl methyl maleate, dipropyl maleate, dibutyl maleate and the like.

One preferred curing agent is the reaction product of isophorone diamine and dimethyl maleate and has the following structural formula:

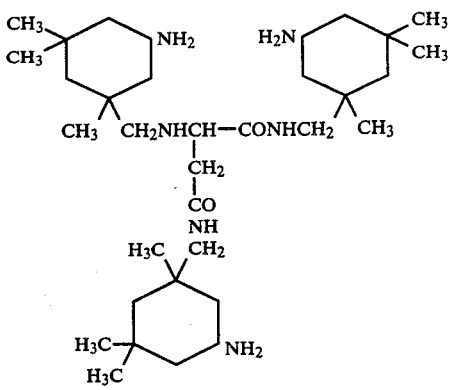

Another group of curing agents can be used to provide relatively soft and elastomeric coatings. These curing agents are prepared through a Michael's reaction in which a multifunctional acrylate or methacrylate is reacted with a polyamine. The polyamine is heated to about 100°–150° C. and then the multifunctional acrylate or methacrylate is reacted with the polyamine for a 1–6 hour period to form an amine terminated curing agent.

Typical multifunctional acrylates or methacrylates that can be used to form the curing agent are trimethylol propane acrylate, trimethylol propane methacrylate, pentaerythritol acrylate, pentaerythritol methacrylate and the like. Any of the aformentioned polyamines can be used to form the curing agent.

The aforementioned curing agents have the following structural formula:

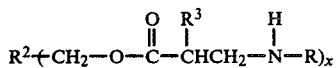

where $R^2$ is a C or a hydrocarbon group, $R^3$ is H or $CH_3$, R is defined in the text above, X is 3 when $R^2$ is a hydrocarbon group and X is 4 when $R^2$ is C.

Generally, the binder contains about 55–90% by weight, of the fluorocarbon polymer, 5–25% by weight of one of the above amine curing agents and 5–20% by weight of a metallic oxide which is an acid acceptor such as magnesium oxide.

Preferably, the composition contains a reinforcing agent such as titanium dioxide pigment usually in a pigment to binder weight ratio of about 20:100 to 200:100. Other inert pigments can be used such as barytes, barium sulfate, fibrous calcium silicate and the like. Carbon black, bone black or lamp black can also be used as a reinforcing pigment in a pigment to binder weight ratio of about 20:100 to 50:100.

Typical organic solvents that are used in the composition are acetone, tetrahydrofuran, methyl ethyl ketone, ethyl acetate, propyl acetate, butyl acetate, isobutyl acetate, methyl isobutyl ketone, methyl amyl acetate, diisobutyl ketone, ethylene glycol monomethyl ether acetate, ethylene glycol monoethyl ether and mixtures of the above. These solvents are used to make the composition and can be used to reduce the composition to an application viscosity.

To decrease curing time and increase toughness of finishes of the composition about 0.1–3% by weight, based on the weight of the binder, of a bicyclic amidine can be added. One preferred bicyclic amidine is 1,8-diazabicyclo(5,4,0)-undecene-7.

To improve resistance to acids at ambient temperatures and elevated temperatures of finishes formed by the composition about 1–20% by weight, based on the weight of the binder, of a perfluoroalkylpropylene oxide can be added. The perfluoroalkylpropylene oxide has the formula

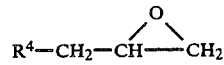

where $R^4$ is a perfluoroalkyl group having 4–12 carbon atoms. Preferably, $R^4$ is a perfluoroalkyl group of a mixture of 6–10 carbon atoms. Preferably, about 5–15% by weight of the perfluoroalkylpropylene oxide is added.

Other advantages of the perfluoroalkylpropylene oxide are as follows: the surface tension of the coating is lowered and the resulting finish has improved release characteristics in comparison to finishes that do not contain the perfluoroalkylpropylene oxide; the wetting of pigments is improved and makes dispersion of pigments less difficult and fluorocarbon polymer solids of the composition can be increased.

A combination of the aforementioned bicyclic amidine and the perfluoroalkyl propylene oxide allows the removal of the metallic oxide from the coating composition and still provides a composition that cures at ambient temperatures. Generally, about 1–10% by weight, based on the weight of binder, of the combination is used. The weight ratio of bicyclic amidine to perfluoroalkylpropylene oxide is about 1:1 to 1:5.

To improve flow of the coating composition and enhance smoothness of the resulting finish about 1–20% by weight, based on the weight of binder, of a glycidyl ester can be added to the composition. Preferably, about 5–15% by weight of glycidyl ester is used. The ester has the formula

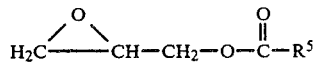

where $R^5$ is a tertiary aliphatic hydrocarbon group having 8–10 carbon atoms.

Generally, the composition is provided to a user as a two component composition. The solvents, fluorocarbon polymer, pigments such as titanium dioxide and metallic oxide acid acceptor are the first component and the amine curing agent is the second component which is blended by the user with the first component to form the coating composition. The composition is then reduced with one of the aforementioned solvents to an application viscosity and then applied to a substrate.

The coating composition can be applied directly over a wide variety of substrates to provide a fluorocarbon polymer coating. Typical substrates are treated or primed steel, phosphatized steel, grit blasted steel, glavanized steel, aluminum, copper, brass, cement and cementitious surfaces such as fire brick, mortar used for fire brick and the like.

Generally, the coating composition is sprayed applied to the substrate and the solvent is allowed to flash off between coatings then the resulting coating is cured at ambient temperatures. The coating can be cured in about 4 to about 48 hours or longer or can be heated to 80° C. to 120° C. for 0.5 to 2.0 hours for rapid curing. Generally, the resulting cured coating is about 75–1500 microns thick.

For some substrates such as untreated steel, a primer is first applied and then while the primer is still wet the coating composition is applied and dried at ambient temperatures or at the above elevated temperatures.

One useful binder contains the aforementioned binder constituents and the proper pigmentation for a primer. Another useful primer contains the aforementioned fluorocarbon polymer, a metallic oxide acid acceptor such as magnesium oxide and an aminoalkoxy silane such as amino-propyl trimethoxysilane or amino-propyl triethoxysilane.

The ambient temperature curing characteristic of the coating composition allows for its application on large vessels and reactors in chemical plants and oil refineries, large metal structures and equipment and pipes, heat risers, i.e., pipes which are used to transport oil from the underground well to the surface, off shore oil well platforms, and on the interior of smoke stacks used by large utility companies. Conventional compositions that do not cure at ambient temperatures but require elevated curing temperatures are not practical to use for the above applications.

The following examples illustrate the invention. All parts and percentages are on a weight basis unless otherwise indicated.

EXAMPLE I

A coating composition was prepared as follows:

|  | Parts by Weight |
|---|---|
| Portion 1 | |
| Titanium dioxide pigment | 100.0 |
| Magnesium oxide | 16.0 |
| Fluorocarbon polymer solution (33% solids solution in ethyl acetate of a copolymer of 60% vinylidene fluoride and 40% hexafluoropropylene having a weight average molecular weight of about 100,000) | 303.0 |
| Portion 2 | |
| Amine curing agent solution (55% solids solution of reaction product of 3 moles of isophorone diamine and 1 mole of dimethyl maleate in isopropanol) | 5.5 |
| Total | 424.5 |

The constituents of portion 1 were charged into a mixing vessel and thoroughly blended and portion 2 was added and blended. The resulting composition was reduced with methyl ethyl ketone solvent to a spray viscosity of about 25 seconds using a No. 2 Zahn cup and sprayed onto grit blasted steel panels and aluminum panels. In each case, thick films were applied by allowing flash drying between each application and the coatings were dried at ambient temperature to provide a 1000 micron thick dry coating. In each case, the coating had excellent adhesion to the metal substrate. After 7 days, the coatings were fully cured and were resistant to sulfuric acid, sodium hydroxide and solvents such as methyl ethyl ketone and ethyl acetate.

A primer was prepared as follows:

|  | Parts by weight |
|---|---|
| Portion 1 | |
| Titanium dioxide pigment | 100 |
| Magnesium oxide | 15 |
| Fluorocarbon polymer solution (33% solids solution in ethyl acetate of a copolymer of 60% vinylidene fluoride and 40% hexafluoropropylene having a weight average molecular weight of about 100,000) | 303 |
| Portion 2 | |
| gamma-aminopropyltrimethoxy silane | 18 |
| Total | 436 |

The constituents of portion 1 were charged into a mixing vessel and thoroughly blended and then portion 2 was added and blended. The resulting composition was reduced to a spray viscosity with methyl ethyl ketone and sprayed onto untreated steel panels and solvent was allowed to flash from the primer at ambient temperatures. The resulting primer coat had a thickness of about 75 microns.

The above coating composition was sprayed onto the primed panels. In each case, thick films were applied by allowing flash drying between each spray application of the coating composition. The resulting coatings were dried at ambient temperatures and gave 1000 micron thick dry coatings.

On each panel, the coating had excellent adhesion to the primer and could not be separated from the primer. After 7 days, each coating was fully cured and was resistant to sulfuric acid, sodium hydroxide and solvents such as methyl ethyl ketone and ethyl acetate.

EXAMPLE 2

The following amine curing agents were prepared:

|  | CURING AGENT (Parts By Weight) | | | |
|---|---|---|---|---|
|  | A | B | C | D |
| Isophorone diamine | 510 | — | 562 | — |
| Hexamethylene diamine | — | 321 | — | 388 |
| Trimethylol propane acrylate | 296 | 296 | — | — |
| Pentaerythritol acrylate | — | — | 298 | 298 |
| Isopropanol | 659 | 505 | 703 | 562 |
| Total | 1465 | 1122 | 1563 | 1248 |

In the preparation of each of the above curing agents A–D, the amine was charged into a reaction vessel and heated to 120°–140° C. and then the acrylate was slowly added at a uniform rate over a 4 hours period and then the reaction mixture was cooled and isopropanol added.

Trimethylol propane acrylate and pentaerythritol acrylate were prepared by conventional techniques well known to those skilled in the art in which an acrylic moiety was reacted with trimethylol propane and with pentaerythritol.

A separate coating composition was prepared with each of the curing agents A–D using the same constituents as in Example 1 for the coating composition except the above curing agent was substituted for the amine curing agent of Example 1. In each case, the resulting coating composition was reduced to a spray viscosity with methyl ethyl ketone as in Example 1 and sprayed onto grit blasted steel panels and aluminum panels allowing the coating to flash dry between each application to provide a 1000 micron thick dry coating. After 7 days, the coatings were fully cured but were softer and more elastic than the coating of Example 1. The coatings were resistant to sulfuric acid, sodium hydroxide and methyl ethyl ketone.

EXAMPLE 3

A coating composition was prepared as follows:

|  | Parts by Weight |
| --- | --- |
| Portion 1 |  |
| Fluorocarbon polymer solution (33.3% solids in ethyl acetate of a copolymer of 60% vinylidene fluoride and 40% hexafluoropropylene having a weight average molecular weight of about 400,000) | 1744.15 |
| Barytes pigment | 580.79 |
| Carbon black pigment | 0.60 |
| Magnesium oxide | 87.19 |
| Perfluoroalkylpropylene oxide of the formula | 29.06 |

$$R^4-CH_2-CH\overset{O}{\overset{\diagup\ \diagdown}{\text{———}}}CH_2$$

| $R^4$ is a mixture of perfluoroalkyl group of 1% $C_4$, 48.5% $C_6$, 34.0% $C_8$, 12.0% $C_{10}$, 2.5% $C_{12}$ and 2% $C_{14}$. |  |
| --- | --- |
| Butyl acetate | 1158.21 |
| Portion 2 |  |
| Amine curing agent solution (described in Example 1) | 49.15 |
| Total | 3649.15 |

The constituents of portion 1 were charged into a mixing vessel and blended and charged into a ball mill and ground to thoroughly disperse the pigments.

Portion 2 was added and blended. The resulting composition was reduced with methyl ethyl ketone solvent to a spray viscosity of about 25 seconds using a No. 2 Zahn cup and sprayed onto grit blasted steel panels and aluminum panels. In each case, thick films were applied by allowing flash drying between each application and the coatings were dried at ambient temperature in 24 hours to a tack free condition to provide a 1000 micron thick dry coating. In each case, the coating had excellent adhesion to the metal substrate. After 7 days, the coatings were fully cured and were resistant to sulfuric acid, sodium hydroxide and solvents such as methyl ethyl ketone and ethyl acetate.

EXAMPLE 4

A pigment dispersion was prepared as follows:

|  | Parts by Weight |
| --- | --- |
| Fluorocarbon polymer solution (described in Example 3) | 1890.0 |
| Titanium dioxide pigment | 630.0 |
| Butyl acetate | 1080.0 |
| Total | 3600.0 |

The above constituents were charged into a ball mill and ground to thoroughly disperse the pigment.

A coating composition was prepared by thoroughly blending together the following constituents:

|  | Parts by Weight |
| --- | --- |
| Pigment dispersion (prepared above) | 971.4 |
| Perfluoroalkylpropylene oxide (described in Example 3) | 30.0 |
| Amine curing agent solution (described in Example 1) | 6.0 |
| Bicyclic amidine solution (10% solids in butyl acetate of 1;8-diaza bicyclo(5,4,0)-undecene-7) | 2.0 |
| Total | 1009.4 |

The resulting composition was reduced with methyl ethyl ketone solvent to a spray viscosity of about 37 seconds using a No. 2 Zahn cup and sprayed onto grit blasted steel panels and aluminum panels. In each case, thick films were applied by allowing flash drying between each application and the coatings were dried at ambient temperature in 24 hours to a tack free condition to provide a 1000 micron thick dry coatings. In each case, the coating had excellent adhesion to the metal substrate. After 7 days, the coatings were fully cured and were resistant to sulfuric acid, sodium hydroxide and solvents such as methyl ethyl ketone and ethyl acetate.

EXAMPLE 5

A pigment dispersion was prepared as follows:

|  | Parts by Weight |
| --- | --- |
| Fluorocarbon polymer solution (described in Example 3) | 1890.0 |
| Titanium dioxide pigment | 630.0 |
| Magnesium oxide | 31.5 |
| Butyl acetate | 1138.5 |
| Total | 3690.0 |

The above constituents were charged into a ball mill and ground to thoroughly disperse the pigment.

A coating composition was prepared by thoroughly blending together the following constituents:

|  | Parts by Weight |
| --- | --- |
| Pigment dispersion (prepared above) | 527.2 |
| Perfluoroalkylpropylene oxide (described in Example 3) | 10.0 |
| Amine curing agent solution (described in Example 1) | 3.0 |
| Bicyclic amidine solution (described in Example 4) | 1.0 |
| Total | 541.2 |

The resulting composition was reduced with methyl ethyl ketone solvent to a spray viscosity of about 37 seconds using a No. 2 Zahn cup and sprayed onto grit blasted steel panels and aluminum panels. In each case, thick films were applied by allowing flash drying between each application and the coatings were dried at ambient temperature in 24 hours to a tack free condition to provide a 1000 micron thick dry coating. In each case, the coating had excellent adhesion to the metal substrate. After 7 days, the coatings were fully cured and were resistant to sulfuric acid, sodium hydroxide and solvents such as methyl ethyl ketone and ethyl acetate.

EXAMPLE 6

A coating composition was prepared by thoroughly blending together the following constituents:

|  | Parts by Weight |
|---|---|
| Pigment dispersion (prepared in Example 5) | 527.2 |
| "Cardura" E Ester (glycidyl ester of the formula 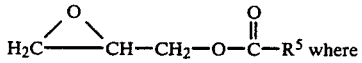 where $R^5$ is a tertiary aliphatic hydrocarbon group of 8-10 carbon atoms) | 10.0 |
| Amine curing agent solution (described in Example 1) | 3.0 |
| Bicyclic amidine solution (described in Example 4) | 1.0 |
| Total | 541.2 |

The resulting composition was reduced with methyl ethyl ketone solvent to a spray viscosity of about 37 seconds using a No. 2 Zahn cup and sprayed onto grit blasted steel panels and aluminum panels. In each case, thick films were applied by allowing flash drying between each application and the coatings were dried at ambient temperature in 24 hours to a tack free condition to provide a 1000 micron thick dry coating. In each case, the coating was very smooth and had excellent adhesion to the metal substrate. After 7 days, the coatings were fully cured and were resistant to sulfuric acid, sodium hydroxide and solvents such as methyl ethyl ketone and ethyl acetate.

EXAMPLE 7

A coating composition was prepared by blending together the following constituents:

|  | Parts by Weight |
|---|---|
| Pigment Dispersion (prepared in Example 5) | 527.2 |
| "Cardura" E Ester (described in Example 6) | 5.0 |
| Perfluoroalkylpropylene oxide (described in Example 3) | 5.0 |
| Amine curing agent solution (described in Example 1) | 3.0 |
| Bicyclic amidine solution (described in Example 4) | 1.0 |
| Total | 541.2 |

The resulting composition was reduced with methyl ethyl ketone solvent to a spray viscosity of about 37 seconds using a No. 2 Zahn cup and sprayed onto grit blasted steel panels and aluminum panels. In each case, thick films were applied by allowing flash drying between each application and the coatings were dried at ambient temperature in 24 hours to a tack free condition to provide a 1000 micron thick dry coating. In each case, the coating was very smooth and had excellent adhesion to the metal substrate. After 7 days, the coatings were fully cured and were resistant to sulfuric acid, sodium hydroxide and solvents such as methyl ethyl ketone and ethyl acetate.

I claim:

1. A coating composition comprising about 10-70% by weight binder and 30-90% by weight of an organic solvent; wherein the binder comprises:
   a fluorocarbon polymer comprising vinylidene fluoride and hexafluoropropylene having a weight average molecular weight of about 50,000-600,000,
   a metallic oxide which is an acid acceptor; and
   a curing agent of the formula

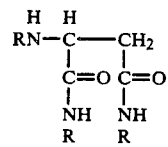

where R is $R^1NH_2$ and $R^1$ is aliphatic or cycloaliphatic hydrocarbon radical.

2. The composition of claim 1 in which the fluorocarbon polymer has a weight average molecular weight of about 50,000-300,000.

3. The composition of claim 1 in which the fluorocarbon polymer has a weight average molecular weight of about 75,000-250,000.

4. The composition of claim 1 in which the fluorocarbon polymer has a weight average molecular weight of about 300,000-400,000.

5. The composition of claim 1 in which the fluorocarbon polymer consists essentially of about 50-70% by weight of vinylidene fluoride and 30-50% by weight of hexafluoropropylene.

6. The composition of claim 5 in which the metallic oxide is magnesium oxide.

7. The composition of claim 6 in which the $R^1$ is a cycloaliphatic hydrocarbon radical.

8. The composition of claim 7 containing a pigment of titanium dioxide.

9. The composition of claim 8 containing about 0.1-3 percent by weight, based on the weight of the binder, of a bicyclic amidine.

10. The composition of claim 9 containing in addition about 1-20% by weight, based on the weight of the binder, of a perfluoroalkylpropylene oxide.

11. The composition of claim 10 in which the perfluoroalkylpropylene oxide has the formula

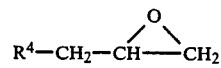

where $R^4$ is a perfluoroalkyl group having 4-12 carbon atoms.

12. The composition of claim 9 containing in addition about 1-20% by weight, based on the weight of the binder, of a glycidyl ester of the formula

where $R^5$ is a tertiary aliphatic hydrocarbon group having 8-10 carbon atoms.

13. The composition of claim 6 in which the curing agent has the formula

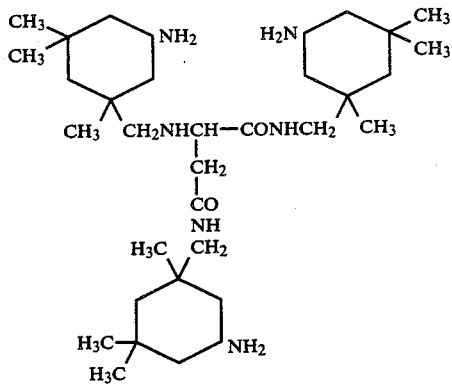

14. The composition of claim 1 in which the binder comprises:
(A) 55–90% by weight of a fluorocarbon polymer consisting essentially of polymerized units of 50–70% by weight, based on the weight of the polymer of vinylidene fluoride and 30–50% by weight, based on the weight of the polymer, of hexafluoropropylene and has a weight average molecular weight of about 75,000–450,000;
(B) 5–20% by weight, based on the weight of the binder, of magnesium oxide;
(C) 5–25% by weight, based on the weight of the binder, of a curing agent of the formula

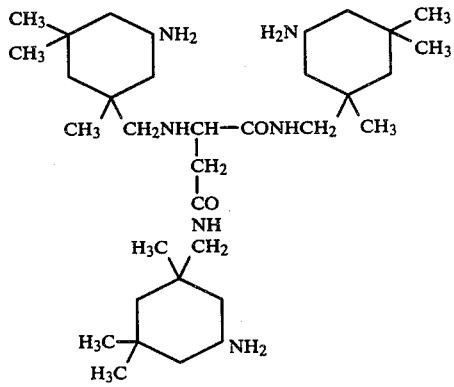

15. The composition of claim 14 containing titanium dioxide pigment in a pigment to binder weight ratio of about 20:100–200:100.

16. The composition of claim 14 containing 0.1–3% by weight, based on the weight of the binder, of 1,8-diaza-bicyclo(5,4,0)-undecene-7.

17. The composition of claim 15 containing in addition about 5–15% by weight, based on the weight of the binder, of perfluoroalkylpropylene oxide.

18. The composition of claim 17 in which the perfluoroalkylpropylene oxide has the formula

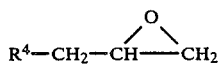

where $R^4$ is a perfluoroalkyl group having 4–12 carbon atoms.

19. The composition of claim 1 containing in addition about 5–15% by weight, based on the weight of the binder, of a glycidyl ester of the formula

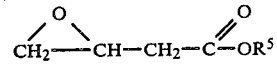

where $R^5$ is a tertiary aliphatic hydrocarbon group having 8–10 carbon atoms.

20. A coating composition comprising about 10–70% by weight binder and 30–90% by weight of organic solvent; wherein the binder comprises:
(A) 55–90% by weight of a fluorocarbon polymer consisting essentially of polymerized units of 50–70% by weight, based on the weight of the polymer, of vinylidene fluoride and 30–50% by weight, based on the weight of the polymer, of hexafluoropropylene and has a weight average molecular weight of about 75,000–450,000;
(B) 5–20% by weight of perfluoroalkylpropylene oxide;
(C) 5–22% by weight of a curing agent of the formula

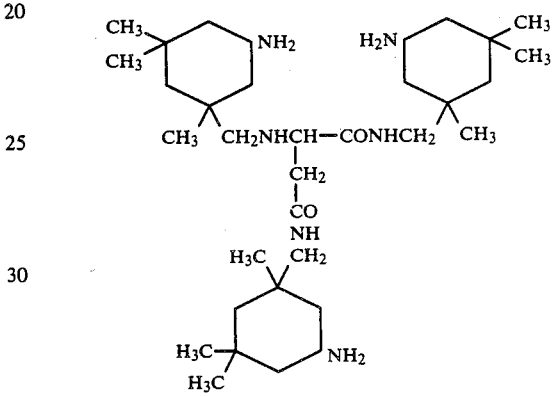

(D) 0.1–3% by weight of a bicyclic amidine.

21. The composition of claim 20 in which the bicyclic amidine is 1,8-diazabicyclo(5,4,0)-undecene-7.

22. The composition of claim 21 containing in addition 1–20% by weight, based on the weight of the binder, of a glycidyl ester of the formula

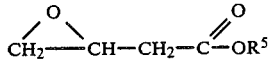

where $R^5$ is a tertiary aliphatic hydrocarbon group having 8–10 carbon atoms.

23. A two component composition, wherein the two components are mixed together to form a composition comprising about 10–70% by weight binder and 30–90% by weight organic solvent and wherein the components comprise
component (1) a solution of a fluorocarbon polymer consisting essentially of vinylidene fluoride and hexafluoropropylene having a weight average molecular weight of about 50,000–600,000 and a metallic oxide which is an acid acceptor; and
component (2) a curing agent of the formula

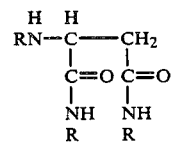

where R is $R^1NH_2$ and $R^1$ is aliphatic or cycloaliphatic hydrocarbon radical.

24. A substrate coated with a layer of the composition of claim 1.

* * * * *